United States Patent
Noh et al.

(10) Patent No.: US 6,809,783 B2
(45) Date of Patent: Oct. 26, 2004

(54) CONDUCTIVE POLARIZER OF LIQUID CRYSTAL DISPLAY DEVICE

(75) Inventors: Jeong Dong Noh, Busan (KR); Chi Hyuck Park, Kyoungki-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 0 days.

(21) Appl. No.: 10/309,988

(22) Filed: Dec. 4, 2002

(65) Prior Publication Data

US 2003/0122997 A1 Jul. 3, 2003

(30) Foreign Application Priority Data

Dec. 31, 2001 (KR) .................................. 10-2001-0088998

(51) Int. Cl.⁷ ............................................. G02F 1/1335
(52) U.S. Cl. ........................... 349/96; 349/40; 349/122; 359/490
(58) Field of Search ........................... 349/96, 40, 141, 349/122; 359/483, 490; 428/1.4, 1.5

(56) References Cited

U.S. PATENT DOCUMENTS

| | | |
|---|---|---|
| 5,353,142 A | 10/1994 | Dodd |
| 5,745,201 A | 4/1998 | Kawai et al. |
| 5,946,057 A | 8/1999 | Kusanagi |
| 6,064,451 A | 5/2000 | Oh et al. |
| 6,108,057 A | 8/2000 | Kusanagi |
| 6,147,738 A * | 11/2000 | Okamoto ..................... 349/122 |
| 6,188,457 B1 | 2/2001 | Liu |
| 6,271,904 B1 | 8/2001 | Liu |
| 6,384,878 B1 | 5/2002 | Kwak |
| 6,525,786 B1 * | 2/2003 | Ono ............................ 349/40 |

* cited by examiner

Primary Examiner—Tarifur R. Chowdhury
Assistant Examiner—Michael H Caley
(74) Attorney, Agent, or Firm—Ladas & Parry LLP

(57) ABSTRACT

Disclosed is a conductive polarizer for a liquid crystal display device. The conductive polarizer comprises: an adhesive layer composed of acrylic materials and conductive materials, the adhesive layer being formed on a substrate; a lower supporting layer formed on the adhesive layer; a polarizer element formed on the lower supporting layer; and an upper supporting layer formed on the polarizer element. Therefore, the occurrence of inferior products, resulting from static electricity arising during attachment of the polarizer can be largely reduced. Furthermore, because the number of ionizers included with the attachment device for the polarizer can be decreased and substituted with other devices, a conductive polarizer of a liquid crystal display device can be produced at low cost.

26 Claims, 2 Drawing Sheets

CONDUCTIVE POLARIZER OF LIQUID CRYSTAL DISPLAY DEVICE

BACKGROUND OF THE INVENTION

1. Field of the Invention

The present invention relates to a conductive polarizer of a liquid crystal display device, and more particularly to a conductive polarizer which has a conductive adhesive layer, thereby preventing the liquid crystal display device from being damaged or deteriorated by static electricity.

2. Description of the Prior Art

As generally known in the art, liquid crystal display devices enable electronic appliances employing them to be lighter and slimmer. Therefore, liquid crystal display devices are nowadays utilized for a variety of electronic goods such as picture display appliances of notebook computers, mobile phones etc., in place of cathode-ray tubes (CRTs), and the market for liquid crystal display devices are expected to enlarge steadily.

Liquid crystal display devices represent information by controlling the polarization state of light emitted from light sources using the birefringent properties of liquid crystal. Therefore, almost all the liquid crystal display devices include a polarizer that functions as a filter with reference to the polarization of light.

The polarizer generally provided is a very thin type of about 150~350 μm in thickness, depending on the kind of adhesive layer formed thereon.

Further, during the bonding step of the polarizer in the manufacturing process of a liquid crystal display device, because static electricity is so easily produced that it affects an internal array element of the liquid crystal display device, which in turn affects the alignment of the liquid crystal, causing the occurrence of inferior products.

Therefore, several conventional technologies have been proposed to solve these problems.

Firstly, in a liquid crystal display device utilizing a transversal electric field that does not form a transparent electrode layer on an upper substrate, a transparent electrode layer is formed on an outer surface of the upper substrate for preventing occurrence of static electricity regardless of the activation state of the liquid crystal.

Secondly, as shown in FIG. 1, an antistatic layer 9 comprising conductive particles 8 is formed on a polarizer element 5 with an upper supporting layer 7 interposed there-between to prevent static electricity from being produced during the attachment of the polarizer. In FIG. 1, as yet unexplained reference numerals 1 and 3 are an adhesive layer and a lower supporting layer, respectively.

However, in the conventional conductive polarizer of a liquid crystal display device explained above, there are several problems which will be explained below.

In the technology of forming a transparent electrode layer on the outer surface of the upper supporting substrate, the transparent electrode layer may easily be impaired during the manufacturing process of a liquid crystal display device, and in the technology of forming an antistatic layer on the outer surface of a polarizer, the effects of the antistatic layer formed on the outer surface of the polarizer are so weak that it can not substantially prevent the occurrence of static electricity.

Further, in the technology of simultaneously applying the above two technologies in order to prevent the occurrence of static electricity, a problem arises in that the costs of manufacturing the liquid crystal display device are increased.

SUMMARY OF THE INVENTION

Accordingly, the present invention has been made to solve the above-mentioned problems occurring in the prior art, and an object of the present invention is to provide a conductive polarizer of a liquid crystal display device, the production of which prevents the occurrence of inferior products, brought about by static electricity arising during the attachment of the polarizer, by including conductive properties in an adhesive layer of the polarizer.

In order to accomplish this object, there is provided a conductive polarizer for a liquid crystal display device comprising an adhesive layer composed of acrylic materials and conductive materials, the adhesive layer being formed on a substrate; a lower supporting layer formed on the adhesive layer; a polarizer element formed on the lower supporting layer; and an upper supporting layer formed on the polarizer element.

In accordance with another aspect of the present invention, there is provided a conductive polarizer of a liquid crystal display device, the conductive polarizer comprising: an adhesive layer composed of acrylic materials and conductive materials, the adhesive layer being formed on a substrate; a lower supporting layer formed on the adhesive layer; a polarizer element formed on the lower supporting layer; an upper supporting layer formed on the polarizer element; and an antistatic layer formed between the adhesive layer and the lower supporting layer.

In accordance with still another aspect of the present invention, there is provided a method for manufacturing a conductive polarizer of a liquid crystal display device, the method comprising the steps of: forming an adhesive layer composed of acrylic materials and conductive materials on a substrate; forming a lower supporting layer on the adhesive layer; forming a polarizer element on the lower supporting layer; and forming an upper supporting layer on the polarizer element.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
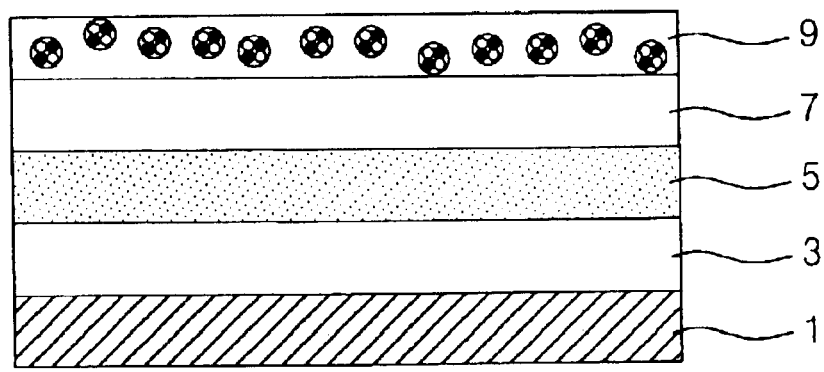
FIG. 1 is a cross sectional view showing a conventional conductive polarizer of a liquid crystal display device.

Hereinafter, preferred embodiments of the present invention will be described with reference to the accompanying drawings. In the following description and drawings, the same reference numerals are used to designate the same or similar components, and so repetition of the description of the same or similar components will be omitted.

Figure 2:
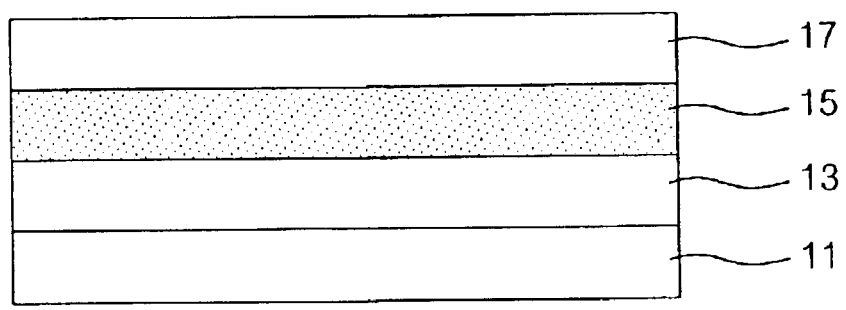
FIGS. 2 and 3 are cross sectional views showing a conductive polarizer of a liquid crystal display device according to one embodiment of the present invention.
Figure 3:
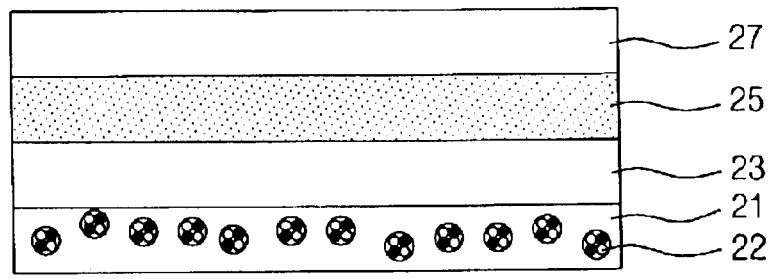
Figure 4:
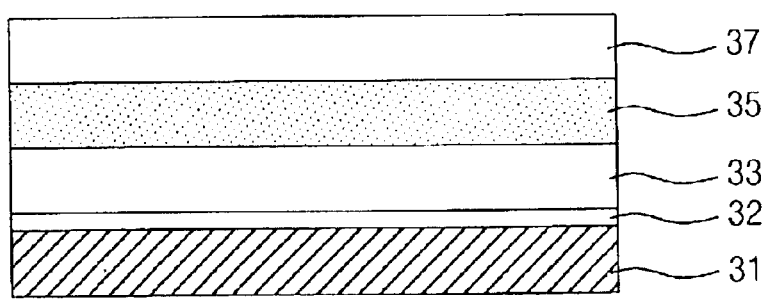
FIG. 4 is a cross sectional view showing another conductive polarizer of a liquid crystal display device according to another embodiment of the present invention.

FIGS. 2 and 3 are cross sectional views showing a conductive polarizer of a liquid crystal display device according to one embodiment of the present invention, and FIG. 4 is a cross sectional view showing another conductive polarizer of a liquid crystal display device according to another embodiment of the present invention.

As shown in FIG. 2, the conductive polarizer of the liquid crystal display device according to the first embodiment of the present invention includes an adhesive layer 11, composed of conductive materials and acrylic materials, which is of 10 to 30 μm in thickness and attaches a polarizer to an outer surface of a substrate (not shown), a lower supporting layer 13 and an upper supporting layer 17 each composed of triacetatecellulose, and a polarizer element 15 composed of PVA (poly vinyl alcohol).

In this embodiment, proper amounts of conductive materials, such as ATO (antimony tin oxide) are added to the adhesive layer 11 so that the adhesive layer 11 can quickly disperse electrical charges, produced by static electricity, to the surroundings with or without additional antistatic layers.

Further, in this embodiment, conductive materials and acrylic materials composing the conductive adhesive layer 11 are mixed at a proper ratio to have a maximum resistance value of $10^{14}$ Ω per unit area.

In FIG. 3, there is also shown one embodiment of a conductive polarizer of a liquid crystal display device according to the present invention, which includes an adhesive layer 21 composed of conductive materials and acrylic materials, the adhesive layer being 10 to 30 μm in thickness and attaching a polarizer to an outer surface of a substrate (not shown), a lower supporting layer 23 and an upper supporting layer 27 composed of triacetatecellulose respectively, a polarizer element 25 composed of PVA (poly vinyl alcohol).

In this embodiment, as conductive particles 22 such as $I_2O_3$, $SnO_2$ NiAu and mixtures thereof having a size of several μm are applied on the adhesive layer 21 together with some added conductive materials, the electrical charges produced by static electricity can be dispersed more quickly to the surroundings by the adhesive layer 21 itself and by the conductive particles 22.

Also, FIG. 4 shows a conductive polarizer of a liquid crystal display device in accordance with another embodiment of the present invention. In this embodiment, the conductive polarizer of the liquid crystal display device includes an adhesive layer 31 composed of acrylic materials and conductive materials having a thickness of 10 to 30 μm, and formed on a substrate (not shown), a lower supporting layer 33 and an upper supporting layer 37 composed of triacetatecellulose, a polarizer element 35 composed of PVA(poly vinyl alcohol), and an antistatic layer 32 formed between the adhesive layer 31 and the lower supporting layer 33.

In this embodiment, the adhesive layer 31 of the polarizer embodies conductive properties generated from the antistatic layer 32 formed between the adhesive layer 31 and the lower supporting layer 33 of the polarizer element. Accordingly, the antistatic layer 32 quickly disperses electrical charges produced by static electricity to the surroundings.

Hereinafter, a method for manufacturing a conductive polarizer of a liquid crystal display device of the present invention is explained. The manufacturing method of this conductive polarizer comprises steps of forming an adhesive layer composed of acrylic materials and conductive materials on a substrate, forming a lower supporting layer on the adhesive layer, forming a polarizer element on the lower supporting layer, and forming an upper supporting layer on the polarizer element.

The conductive materials are mixed with the acrylic materials at a proper ratio to have a maximum resistance value of $10^{14}$ Ω per unit area.

Additionally, an antistatic layer may be formed between the adhesive layer and the lower supporting layer.

The antistatic layer is made to have a maximum resistance value of $10^{14}$ Ω per unit area.

As described above, in accordance with the present invention, the occurrence of inferior products, resulting from static electricity arising during attachment of the polarizer can be largely reduced. Furthermore, because the number of ionizers included with the attachment device for the polarizer can be decreased and substituted with other devices, a conductive polarizer of a liquid crystal display device according to the present invention can be produced at low cost.

Although preferred embodiments of the present invention has been described for illustrative purposes, those skilled in the art will appreciate that various modifications, additions and substitutions are possible, without departing from the scope and spirit of the invention as disclosed in the accompanying claims.

What is claimed is:

1. A conductive polarizer of a liquid crystal display device, the conductive polarizer comprising:

an adhesive layer composed of acrylic materials and conductive materials, the adhesive layer being formed on a substrate, wherein an antimony tin oxide (ATO) is one of the conductive materials;

a lower supporting layer formed on the adhesive layer;

a polarizer element formed on the lower supporting layer; and an upper supporting layer formed on the polarizer element.

2. The conductive polarizer as claimed in claim 1, wherein the conductive materials are mixed with the acrylic materials at a proper ratio to have a maximum of resistance value of $10^{14}$ Ω per unit area.

3. The conductive polarizer as claimed in claim 1, wherein the conductive materials are dispersed in the adhesive layer in a form of conductive particles, each particle being a few μm in size.

4. The conductive polarizer as claimed in claim 1, wherein the adhesive layer is of 10 to 30 μm in thickness.

5. The conductive polarizer as claimed in claim 1, the conductive polarizer further comprising:

an antistatic layer formed between the adhesive layer and the lower supporting layer.

6. The conductive polarizer as claimed in claim 5, wherein the antistatic layer is made to have a resistance value in the range of 0 to $10^{14}$ Ω per unit area.

7. The conductive polarizer as claimed in claim 1, wherein the conductive materials are mixed with acrylic materials at a proper ratio to have a resistance value greater than $10^6$ Ω per unit area but less than or equal to $10^{14}$ Ω per unit area.

8. A conductive polarizer of a liquid crystal display device, the conductive polarizer comprising:

an adhesive layer composed of acrylic materials and conductive materials, the adhesive layer being formed on a substrate, wherein conductive particles are composed of $I_2O_3$, $SnO_2$, NiAu and mixtures thereof;

a lower supporting layer formed on the adhesive layer;

a polarizer element formed on the lower supporting layer; and an upper supporting layer formed on the polarizer element.

9. The conductive polarizer as claimed in claim 8, wherein the conductive materials are mixed with the acrylic materials at a proper ratio to have a maximum resistance value of $10^{14}$ Ω per unit area.

10. The conductive polarizer as claimed in claim 8, wherein the conductive materials are mixed with acrylic materials at a proper ratio to have a resistance value greater than $10^6$ Ω per unit area but less than or equal to $10^{14}$ Ω per unit area.

11. The conductive polarizer as claimed in claim 8, wherein the adhesive layer is of 10 to 30 μm in thickness.

12. The conductive polarizer as claimed in claim 8, the conductive polarizer further comprising: an antistatic layer formed between the adhesive layer and the lower supporting layer.

13. The conductive polarizer as claimed in claim 12, wherein the conductive materials are mixed with the acrylic materials at a proper ratio to have a resistance value in the range of 0 to $10^{14}$ Ω per unit area.

14. A method for manufacturing a conductive polarizer of a liquid crystal display device, the method comprising the steps of:
    forming an adhesive layer composed of acrylic materials and conductive materials including antimony tin oxide (ATO) on a substrate;
    forming a lower supporting layer on the adhesive layer;
    forming a polarizer element on the lower supporting layer; and
    forming an upper supporting layer on the polarizer element.

15. The method for manufacturing a conductive polarizer as claimed in claim 14, wherein the conductive materials are mixed with the acrylic materials at a proper ratio to have a maximum of resistance value of $10^{14}$ Ω per unit area.

16. The method for manufacturing a conductive polarizer as claimed in claim 14, wherein the conductive materials are dispersed in the adhesive layer in a form of conductive particles, each particle being a few μm in size.

17. The method for manufacturing a conductive polarizer as claimed in claim 14, wherein the adhesive layer is of 10 to 30 μm in thickness.

18. The method for manufacturing a conductive polarizer of a liquid crystal display device as claimed in claim 14, the method further comprising the step of:
    forming an antistatic layer between the adhesive layer and the lower supporting layer.

19. The method for manufacturing a conductive polarizer as claimed in claim 18, wherein the antistatic layer is made to have a resistance value in the range of 0 to $10^{14}$ Ω per unit area.

20. The method far manufacturing a conductive polarizer a claimed in claim 14, wherein conductive materials are mixed with acrylic materials at a proper ratio to have a resistance value greater than $10^6$ Ω per unit area but less than $10^{14}$ Ω per unit area.

21. A method for manufacturing a conductive polarizer of a liquid crystal display device, the method comprising the steps of:
    forming an adhesive layer composed of acrylic materials and conductive materials on a substrate, wherein the conductive particles are composed of $I_2O_3$, $SnO_2$, NiAu and mixtures thereof;
    forming a lower supporting layer on the adhesive layer;
    forming a polarizer element on the lower supporting layer; and
    forming an upper supporting layer on the polarizer element.

22. The conductive polarizer as claimed in claim 21, wherein the conductive materials are mixed with the acrylic materials at a proper ratio to have a maximum resistance value of $10^{14}$ Ω per unit area.

23. The method for manufacturing a conductive polarizer a claimed in claim 21, wherein conductive materials are mixed with acrylic materials at a proper ratio to have a resistance value greater then $10^6$ Ω per unit area but less than $10^{14}$ Ω per unit area.

24. The conductive polarizer as claimed in claim 21, wherein adhesive layer is of 10 to 30 μm in thickness.

25. The conductive polarizer as claimed in claim 21, the conductive polarizer further comprising: an antistatic layer formed between the adhesive layer and the lower supporting layer.

26. The conductive polarizer as claimed in claim 25, wherein the conductive materials are mixed with the acrylic materials at a proper ratio to have a resistance value in the range of 0 to $10^{14}$ Ω per unit area.

* * * * *